United States Patent [19]
Tane et al.

[11] Patent Number: 5,128,381
[45] Date of Patent: Jul. 7, 1992

[54] POLYURETHANE FOAM FOR CUSHIONING MATERIALS

[75] Inventors: Kouichi Tane; Katsuya Motojima; Yasumasa Sawachika, all of Ashikaga; Tetsuya Oda; Yoshio Sakaguchi, both of Wako, all of Japan

[73] Assignees: Achilles Corporation; Honda Giken Kogyo Kabushiki Kaisha, both of Tokyo, Japan

[21] Appl. No.: 634,541

[22] Filed: Dec. 27, 1990

[30] Foreign Application Priority Data

Dec. 27, 1989 [JP] Japan .................................. 1-339088

[51] Int. Cl.$^5$ .............................................. C08G 18/14
[52] U.S. Cl. .................................. 521/117; 521/160; 521/174; 521/176
[58] Field of Search ................ 521/117, 160, 174, 176

[56] References Cited

U.S. PATENT DOCUMENTS 3,857,800 12/1974 Fishbein et al. ..................... 521/174
4,923,904 5/1990 Hasegawa et al. ................. 521/174

*Primary Examiner*—Maurice J. Welsh
*Attorney, Agent, or Firm*—Sherman and Shalloway

[57] ABSTRACT

Disclosed herein is a polyurethane foam for cushioning materials. The polyurethane foam is formed by reacting a mixture of a polyol component, a polyisocyanate component and other optional components. The polyol component contains a mixed polyol which is composed of a low-hydroxyl-number polyol having a hydroxyl number of 30–80 and a high-hydroxyl-number polyol having a hydroxyl number of 350–600 and has an average hydroxyl number of 120–170. The mixture may additionally contain a plasticizer component containing at least one kind of plasticizer having one active hydrogen atom per molecule.

20 Claims, No Drawings

POLYURETHANE FOAM FOR CUSHIONING MATERIALS

BACKGROUND OF THE INVENTION (i) Field of the Invention

The present invention relates to a polyurethane foam for cushioning materials.

(ii) Description of the Related Art

A cushioning material has heretofore been considered ideal when its stress-strain curve extends linearly like metal springs while retaining a suitable degree of rigidity. Conventional cushioning materials have therefore been developed with a view toward making their stress-strain curves closer to those of metal springs. In the case of cushioning materials of the polyurethane foam type, high-resiliency foams obtained from a polyol and a polyisocyanate, each of which has relatively lower functionality and high molecular weight, have been considered to be cushioning materials close to ideal ones. According to recent human engineering considerations, foams which can provide support of more uniform distribution for a user in a lying or seating position and can smoothly follow his movements are however considered to be good cushioning materials.

Based on the foregoing viewpoint, the present inventors proceeded with an extensive investigation with a view toward developing cushioning materials of excellent properties. As a result, it was found that a foam having only small stress variations in a range of about 25-60% in terms of strain rate and a high hysteresis loss of about 50% or higher as opposed to 20-40% of the conventional cushioning materials would be preferred as cushioning materials whose development was been desired at that time.

The properties that stress variations are small in the range of about 25-60% in terms of strain rate and the hysteresis loss is about 50% or higher are however properties inherent to semirigid foams already developed for shock-absorbing performance. It was also known that such properties could be obtained by using a polyol component, whose hydroxyl number was 100-300 or so, as a polyol component upon production of a polyurethane foam. Conventional shock-absorbing foams which were available from the use of polyols having a hydroxyl number of 100-300 however had a very large permanent compression set so that they were unable to restore their initial thickness when they were repeatedly compressed over a long time likewise cushioning materials. Such conventional shock-absorbing foams were therefore practically unusable as cushioning materials even when they had a stress-strain curve and a hysteresis loss such as those required recently for cushioning materials.

SUMMARY OF THE INVENTION

The present invention has been completed with the foregoing drawbacks of the conventional cushioning materials in view. An object of the present invention is therefore to provide a polyurethane foam suitable for use as excellent cushioning materials having a small permanent compression set while retaining the inherent features of semirigid foams that stress variations are small in the range of about 25-60% in terms of strain rate and hysteresis loss is large.

In one aspect of the present invention, there is thus provided a polyurethane foam for cushioning materials, said polyurethane foam having been formed by reacting a mixture containing a polyol component and a polyisocyanate component, wherein the polyol component contains a mixed polyol which is composed of a low-hydroxyl-number polyol having a hydroxyl number of 30-80 and a high-hydroxyl-number polyol having a hydroxyl number of 350-600 and has an average hydroxyl number of 120-170. Further, a plasticizer component containing at least one kind of specific plasticizer having one active hydrogen atom per molecule can optionally be used in combination with the above-mentioned polyol component to enhance the flexibility of the polyurethane foam without decreasing the hysteresis loss.

Owing to the combined use of the specific polyols as the polyol component, the polyurethane foam of the present invention has a stress-strain curve and a high hysteresis loss of at least 50% similar to those exhibited by shock-absorbing polyurethane foams which are considered ideal as cushioning materials in recent years. The polyurethane foam of the present invention has a very small permanent compression set, and is therefore free from the potential problem of the conventional shock-absorbing polyurethane foams that the initial thickness cannot be restored when subjected to repeated compression. The polyurethane foam of the present invention therefore has excellent properties as a cushioning material. In addition, the combined use of the specific plasticizer makes it possible to further improve the flexibility without decreasing the hysteresis loss, thereby bringing about the advantage that cushioning materials having a high hysteresis loss, a small permanent compression set and superb flexibility can be furnished.

DETAILED DESCRIPTION OF THE INVENTION AND PREFERRED EMBODIMENTS

It is essential for the present invention to use two types of polyols as a polyol component to be reacted with a polyisocyanate component, one being a polyol having a hydroxyl number of 30-80 (hereinafter abbreviated as a "low-hydroxyl-number-polyol") and the other a polyol having a hydroxyl number of 350-600 (hereinafter abbreviated as a "high-hydroxyl-number polyol". The low-hydroxyl-number polyol may preferably be a polyol which has been obtained by adding at least one alkylene oxide such as ethylene oxide, propylene oxide, butylene oxide and/or the like to a compound containing 3-4 active hydrogen atoms per molecule and contains 3-4 hydroxyl groups per molecule. The high- hydroxyl-number polymer may preferably be a polyol which has been obtained by adding one or more similar alkylene oxide to a similar compound and contains 3-4 hydroxyl groups per molecule. If the compound contains 2 or less active hydrogen atom per molecule, the resulting polyurethane foam will undergo greater stress variations for changes in strain. If the number of active hydrogen atoms per molecule is 5 or greater on the other hand, the resulting polyurethane foam will become more rigid, leading to a greater permanent compression set. Examples of the compound containing 3-4 active hydrogen atoms include glycerin, trimethylolpropane, 1,2,6-hexantriol, triethanolamine, pentaerythritol, ethylenediamine, methylglycoside, tolylenediamine, and tetramethylolcyclohexane. Two or more low-hydroxyl-number polyols can be used in combination in the present invention. Similarly, the present invention allows to use two or more high-hydroxyl-number polyols in combination.

The polyol component which makes up the polyurethane foam of the present invention must contain both the low-hydroxyl-number polyol and the high-hydroxyl-number polyol and must have an average hydroxyl number of 120-170. A mixed polyol of such an average hydroxyl number can be obtained by suitably mixing the low-hydroxyl-number polyol and the high-hydroxyl-number polyol such that the average hydroxyl number becomes 120-170. It is however preferred to mix the low-hydroxyl-number polyol and the high-hydroxyl-number polyol at a weight ratio in a range of from about 85:15 to 70:30. It is impossible to obtain a foam having a high hysteresis loss and a low permanent compression set if the mixed polyol does not contain either one of the low-hydroxyl-number polyol and the high-hydroxyl-number polyol or the average hydroxyl number of the mixed polyol falls outside the range specified above. To an extent not impairing the objects of the present invention, the polyol component may contain one or more polyols other than the low-hydroxyl-number polyol or the high-hydroxyl-number polyol. It is however preferred to limit the content of such other polyols below 20 wt. %, especially below 10 wt. %.

As the polyisocyanate component which also constitutes the polyurethane foam of this invention, any polyisocyanate can be employed without limitations provided that the polyisocyanate is used for general polyurethane foams. Usable polyisocyanates include, for example, the 2,4-isomer and 2,6-isomer of tolylene diisocyanate and their mixtures, diphenylmethane diisocyanate, hexamethylene diisocyanate and naphthalene diisocyanate. These polyisocyanates can be used either singly or in combination. From the viewpoint of control of the foaming reaction, it is preferable to use a 80:20 to 65:35 mixture (by weight ratio) of the 2,4-isomer and 2,6-isomer of tolylene diisocyanate.

Although no particular limitation is imposed on the ratio of the polyol component and the polyisocyanate component to be reacted, it is preferable from the standpoint of maintenance of a low permanent compression set to react them at a ratio such that the NCO/OH ratio falls within a range of from 0.90 to 1.00.

Upon reaction of the polyol component and the polyisocyanate component, a catalyst, a blowing agent, a foam stabilizer, and the like are also used. In addition, a plasticizer component can also be used in combination in order to provide a polyurethane foam with improved flexibility. It is however to be noted that, in the case of the polyurethane foam making use of the mixed polyol, addition of a plasticizer component employed in general polyurethane foams leads to improved flexibility but results in a decreased hysteresis loss. Where a plasticizer component is used in this invention, the plasticizer component contains at least one kind of plasticizer, which must contain one active hydrogen atom per molecule. Illustrative of such a plasticizer include alcohols represented by the following formula:

ROH  (1)

wherein R is an alkyl group having 5-14 carbon atoms, phenols represented by the following formula:

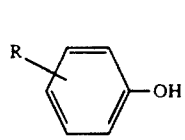

wherein R is an alkyl group having 5-14 carbon atoms, and alkyl hydroxyalkyl phthalates represented by the following formula:

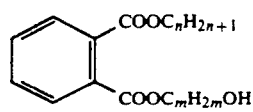

wherein n is an integer of 6-10 and m stands for an integer of 2-4. The plasticizer cannot exhibit plasticizing effects when its molecular weight is too low, but its compatibility with the polyol component is reduced when its molecular weight is too high. Therefore, as the alcohols represented by the formula (1), it is necessary to use alcohols in which the alkyl groups contain 5—carbon atoms, for example, pentyl alcohol, heptyl alcohol, octyl alcohol, nonyl alcohol, decyl alcohol, undecyl alcohol, dodecyl alcohol and tetradecyl alcohol. Alcohols in which the alkyl groups contain 5-10 carbon atoms are more preferred. As the phenols represented by the formula (2), it is necessary to employ phenols in which the alkyl substituents contain 5-14 carbon atoms, for example, pentylphenol, octylphenol, nonylphenol, decylphenol and dodecylphenol. Phenols in which the alkyl substituents contain 5-10 carbon atoms are more preferred. Among the compounds represented by the formula (1) or (2), particularly preferred are n-nonyl alcohol, n-decyl alcohol, n-nonylphenyl and n-decylphenol. Among the alkyl hydroxyalkyl phthalates represented by the formula (3), those of the formula (3) in which n=7-9 and m=2-3 are preferred. In the compounds represented by the formula (1), (2) or (3), the alkyl groups are not limited to linear ones but may include branched alkyl groups. The plasticizer component containing at least one kind of these plasticizers can be added in a proportion of 1-15 parts by weight, preferably 3-10 parts by weight per 100 parts by weight of the polyol component.

As the catalyst, it is possible to use any one of amine catalysts which are employed for the production of general polyurethane foams. As the blowing agent, water and low-boiling halogenated hydrocarbons such as Freon-11 (trade name) and methylene chloride can be used either singly or in combination. As the foam stabilizer, it is possible to use any one of conventional foam stabilizers of the organosilicone type, such as organopolysiloxane-polyoxyalkylene copolymers. Upon production of the polyurethane foam of the present invention, one or more of flame retardants, fillers and pigments can be added further as needed.

The polyurethane foam of the present invention can be used as a cushioning material by forming it into a desired shape by a conventional molding or forming method such as a slab-extrusion or molding method.

The present invention will hereinafter be described in further detail by the following examples and comparative examples.

EXAMPLES 1-6 & COMPARATIVE EXAMPLES 1-10

In each of the examples and comparative examples, the polyol indicated in Table 1 was added with the water, catalyst and foam stabilizer also specified in the same table. The polyol was reacted with a polyisocyanate, which was a 65/35 (weight ratio) mixture of the 2,4-isomer and 2,6-isomer of tolylene diisocyanate, such that the NCO/OH index also shown in the same table was given, whereby a polyurethane foam was obtained. Physical properties of the resultant foam are shown in Table 2.

plasticizer, water, catalyst and foam stabilizer also specified in the same table. The resultant mixture was added further with a polyisocyanate, which was a 65/35 (weight ratio) mixture of the 2,4-isomer and 2,6-isomer of tolylene diisocyanate, such that the NCO/OH index also shown in the same table was given. The reaction mixture thus prepared was stirred at 3,500 rpm for 5 seconds, and was then poured into a mold which had been heated to 50° C. in advance. The resulting green body was placed along with the mold in an oven which was controlled at 90.C. After the green body was cured there for 10 minutes, the resultant foam was taken out of the mold. Physical properties of the foam thus obtained are summarized in Table 4.

TABLE 1

|  | Example | | | | | | Comparative Example | | | | | | | | | |
|---|---|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 | 9 | 10 |
| Polyol-1[1] | 75 | — | — | 76 | — | — | 86 | — | — | 67 | — | — | — | — | 85 | — |
| Polyol-2[2] | — | — | 75 | — | 70 | — | — | 82 | — | 55 | — | — | — | — | — | 85 |
| Polyol-3[3] | — | 81 | — | — | — | 79 | — | 90 | — | — | — | 67 | — | — | — | — |
| Polyol-4[4] | 25 | 19 | 25 | — | 30 | — | — | 10 | 18 | — | 45 | — | — | — | — | — |
| Polyol-5[5] | — | — | — | 24 | — | 21 | 14 | — | — | 33 | — | 33 | 25 | 30 | — | — |
| Polyol-6[6] | — | — | — | — | — | — | — | — | — | — | — | — | 75 | 70 | — | — |
| Polyol-7[7] | — | — | — | — | — | — | — | — | — | — | — | — | — | — | 15 | 15 |
| Average hydroxyl number of polyol | 126 | 140 | 140 | 148 | 156 | 168 | 101 | 111 | 117 | 189 | 209 | 218 | 146 | 170 | 147 | 163 |
| Water | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Catalyst-1[8] | 0.6 | 0.6 | 0.6 | 0.5 | 0.5 | 0.5 | 0.6 | 0.6 | 0.6 | 0.5 | 0.5 | 0.5 | 0.6 | 0.6 | 0.6 | 0.6 |
| Catalyst-2[9] | 0.3 | 0.3 | 0.3 | 0.2 | 0.2 | 0.2 | 0.3 | 0.3 | 0.3 | 0.2 | 0.2 | 0.2 | 0.3 | 0.3 | 0.3 | 0.3 |
| Foam stabilizer-1[10] | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Foam stabilizer-2[11] | 1.5 | 1.5 | 1.5 | 1.5 | 1.5 | 1.5 | 2.0 | 1.0 | 1.0 | 1.5 | 1.5 | 1.5 | 2.0 | 2.0 | 2.0 | 2.0 |
| NCO/OH Index | 100 | 100 | 100 | 100 | 100 | 100 | 100 | 100 | 100 | 100 | 100 | 100 | 100 | 100 | 100 | 100 |

TABLE 2

|  | Example | | | | | | Comparative Example | | | | | | | | | |
|---|---|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 | 9 | 10 |
| Density, kg/m$^3$ | 55.0 | 55.4 | 55.0 | 55.6 | 53.7 | 57.7 | 55.6 | 55.5 | 55.2 | 53.2 | 50.8 | 56.5 | 54.2 | 53.4 | 56.1 | 55.7 |
| ILD[12], kg | 15.0 | 23.7 | 20.1 | 18.8 | 18.3 | 23.0 | 14.2 | 14.5 | 15.3 | 30.8 | 26.9 | 27.0 | 16.3 | 21.1 | 16.5 | 21.3 |
| Hysteresis loss[13], % | 51 | 56 | 55 | 56 | 59 | 65 | 43 | 45 | 46 | 72 | 77 | 82 | 45 | 46 | 56 | 65 |
| Permanent compression set[14], % | 6.0 | 4.0 | 6.7 | 8.4 | 3.8 | 10.5 | 2.6 | 4.0 | 3.0 | 17.2 | 26.6 | 42.1 | 4.0 | 6.2 | 24.2 | 31.4 |

EXAMPLES 7-12 & COMPARATIVE EXAMPLES 11-14

In each of the examples and comparative examples, the polyol indicated in Table 3 was added with the

TABLE 3

|  | Example | | | | | | Comparative Example | | | |
|---|---|---|---|---|---|---|---|---|---|---|
|  | 7 | 8 | 9 | 10 | 11 | 12 | 11 | 12 | 13 | 14 |
| Polyol-1[1] | — | — | — | 76 | — | — | 86 | — | 67 | — |
| Polyol-2[2] | 80 | — | 75 | — | 70 | — | — | — | — | 55 |
| Polyol-3[3] | — | 81 | — | — | — | 79 | — | 90 | — | — |
| Polyol-4[4] | 20 | 19 | 25 | — | 30 | — | — | 10 | — | 45 |
| Polyol-5[5] | — | — | — | 24 | — | 21 | 14 | — | 33 | — |
| Average hydroxyl number of polyol | 124 | 140 | 140 | 148 | 156 | 168 | 101 | 111 | 189 | 209 |
| Water | 2.0 | 2.0 | 2.0 | 2.0 | 2.0 | 2.0 | 2.0 | 2.0 | 2.0 | 2.0 |
| Catalyst-1[8] | 0.6 | 0.6 | 0.6 | 0.5 | 0.5 | 0.5 | 0.6 | 0.6 | 0.5 | 0.5 |
| Catalyst-2[9] | 0.3 | 0.3 | 0.3 | 0.2 | 0.2 | 0.2 | 0.3 | 0.3 | 0.2 | 0.2 |
| Foam stabilizer-1[10] | 1.0 | 1.0 | 1.0 | 1.0 | 1.0 | 1.0 | 1.0 | 1.0 | 1.0 | 1.0 |
| Foam stabilizer-2[11] | 1.5 | 1.5 | 1.5 | 1.5 | 1.5 | 1.5 | 2.0 | 2.0 | 1.5 | 1.5 |
| Plasticizer-1[15] | 3.0 | — | — | — | — | 10.0 | — | — | — | — |
| Plasticizer-2[16] | — | 3.0 | — | — | — | — | — | — | — | — |
| Plasticizer-3[17] | — | — | 5.0 | — | — | — | — | — | 10.0 | — |
| Plasticizer-4[18] | — | — | — | 5.0 | 10.0 | — | — | — | — | 10.0 |
| Plasticizer-5[19] | — | — | — | — | — | — | 20.0 | — | — | — |
| Plasticizer-6[20] | — | — | — | — | — | — | — | 20.0 | — | — |
| NCO/OH Index | 100 | 100 | 100 | 100 | 100 | 100 | 100 | 100 | 100 | 100 |

TABLE 4

| | Example | | | | | | Comparative Example | | | |
|---|---|---|---|---|---|---|---|---|---|---|
| | 7 | 8 | 9 | 10 | 11 | 12 | 11 | 12 | 13 | 14 |
| Density, kg/m³ | 56.2 | 56.4 | 57.6 | 57.1 | 61.3 | 64.0 | 66.8 | 68.5 | 63.9 | 65.2 |
| ILD[12], kg | 18.8 | 20.1 | 18.5 | 16.9 | 14.4 | 15.4 | 9.7 | 8.5 | 15.0 | 16.9 |
| Hysteresis loss[13], % | 57 | 55 | 60 | 61 | 66 | 71 | 40 | 41 | 79 | 85 |
| Permanent compression set[14], % | 5.4 | 4.6 | 6.7 | 6.3 | 9.7 | 11.4 | 2.2 | 3.4 | 25.6 | 35.0 |

In Tables 1 through 4, the reactants, additives and physical properties distinguished by the superscript 1) to 20), respectively are as follows:

1) Triol (hydroxyl number: 37).
2) Triol (hydroxyl number: 56).
3) Triol (hydroxyl number: 80).
4) Triol (hydroxyl number: 395).
5) Triol (hydroxyl number: 500).
6) Triol (hydroxyl number: 28).
7) Triol (hydroxyl number: 770).
8) 33% Triethylenediamine/dipropylene glycol.
9) N,N,N',N",N"-pentamethyldiethylenetriamine.
10) Silicone "Y-6827" (trade name; product of Nippon Unicar Co., Ltd., Tokyo, Japan).
11) Silicone "PRX-607" (trade name: product of Toray-Silicone Co., Ltd., Tokyo, Japan).
12) ILD (indentation load deflection) measured at 20° C. in accordance with JIS K6401.
13) Hysteresis loss measured at 20° C. in accordance with ASTM D1564.
14) Permanent compression set measured at 20° C. in accordance with JIS K6401.
15) n-Pentyl alcohol.
16) n-Nonyl alcohol.
17) n-Decylphenol.
18) 2-Ethylhexyl hydroxyethyl phthalate.
19) Dioctyl phthalate.
20) Trioctyl phosphate.

What is claimed is:

1. A polyurethane foam for cushioning materials, said polyurethane form having been formed by reacting a mixture containing a polyol component and a polyisocyanate component, wherein the polyol component contains a mixed polyol which is composed of a low-hydroxyl-number polyol having a hydroxyl number 30-80 and a high-hydroxyl-number polyol having a hydroxyl number of 350-600 and has an average hydroxyl number of 120-170, and the weight ratio of the low-hydroxyl-number polyol to the high-hydroxyl-number polyol is from 85:15 to 70:30.

2. The polyurethane foam of claim 1, wherein the low-hydroxyl-number polyol is a polyol which has been obtained by adding at least one alkylene oxide to a compound containing 3-4 active hydrogen atoms per molecule, contains 3-4 hydroxyl groups per molecule and has a hydroxyl number of 30-80; and the high-hydroxyl-number polymer is a polyol which has been obtained by adding at least one alkylene oxide to a compound containing 3-4 active hydrogen atoms, contains 3-4 hydroxyl groups per molecule and has a hydroxyl number of 350-600.

3. The polyurethane foam of claim 2, wherein the former and latter alkylene oxides are independently selected from the group consisting of ethylene oxide, propylene oxide and butylene oxide.

4. The polyurethane foam of claim 1, wherein the mixed polyol amounts to 80 wt. % of the whole polyol component.

5. The polyurethane foam of claim 1, wherein the polyisocyanate component contains a mixed polyisocyanate composed of 2,4-tolylenediisocyanate and 2,6-tolylenediisocyanate at a weight ratio ranging from 80:20 to 65:35.

6. The polyurethane foam of claim 1, wherein the polyol component and the polyisocyanate component are reacted at a ratio such that the NCO/OH ratio falls within a range of 0.90–1.00.

7. A polyurethane foam for cushioning materials, said polyurethane foam having been formed by reacting a mixture containing a polyol component, a polyisocyanate component and a plasticizer component, wherein the polyol component contains a mixed polyol, which is composed of a low-hydroxyl-number polyol having a hydroxyl number of 30-80 and a high-hydroxyl-number polyol having a hydroxyl number of 350-600 and has an average hydroxyl number of 120-170, and the plasticizer component contains at least one kind of plasticizer, which contains one active hydrogen atom per molecule.

8. The polyurethane foam of claim 7, wherein the low-hydroxyl-number polyol is a polyol which has been obtained by adding at least one alkylene oxide to a compound containing 3-4 active hydrogen atoms per molecule, contains 3-4 hydroxyl groups per molecule and has a hydroxyl number of 30-80; and the high-hydroxyl-number polymer is a polyol which has been obtained by adding at least one alkylene oxide to a compound containing 3-4 active hydrogen atoms, contains 3-4 hydroxyl groups per molecule and has a hydroxyl number of 350-600.

9. The polyurethane foam of claim 8, wherein the former and latter alkylene oxides are independently selected from the group consisting of ethylene oxide, propylene oxide and butylene oxide.

10. The polyurethane foam of claim 7, wherein the mixing ratio of the low-hydroxyl-number polyol to the high-hydroxyl-number polyol ranges from 85:15 to 70:30 by weight.

11. The polyurethane foam of claim 7, wherein the mixed polyol amounts to 80 wt. % of the whole polyol component.

12. The polyurethane foam of claim 7, wherein the polyisocyanate component contains a mixed polyisocyanate composed of 2,4-tolylenediisocyanate and 2,6-tolylenediisocyanate at a weight ratio ranging from 80:20 to 65:35.

13. The polyurethane foam of claim 7, wherein the polyol component and the polyisocyanate component are reacted at a ratio such that the NCO/OH ratio falls within a range of 0.90–1.00.

14. The polyurethane foam of claim 7, wherein the plasticizer is an alcohol represented by the following formula:

ROH wherein R is an alkyl group having 5-14 carbon atoms.

15. The polyurethane foam of claim 7, wherein the plasticizer is a phenol represented by the following formula:

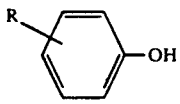

wherein R is an alkyl group having 5-14 carbon atoms.

16. The polyurethane foam of claim 7, wherein the plasticizer is an alkyl hydroxyalkyl phthalate represented by the following formula:

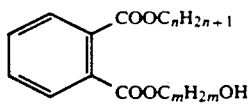

wherein n is an integer of 6-10 and m stands for an integer of 2-4.

17. The polyurethane foam of claim 7, wherein the plasticizer is an alkyl hydroxyalkyl phthalate represented by the following formula:

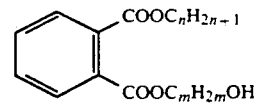

wherein n is an integer of 7-9 and m stands for an integer of 2-3.

18. The polyurethane foam of claim 7, wherein the plasticizer component is added in a proportion of 1-15 parts by weight per 100 parts by weight of the polyol component.

19. The polyurethane foam of claim 1 which, in additional, contains a plasticizer component in an amount of 1-15 parts by weight per 100 parts by weight of the polyol component.

20. The polyurethane foam of claim 19 wherein the plasticizer is an organic compound containing a hydroxyl group and an alkyl group having 5-14 carbon atoms.

* * * * *